US009069897B2

(12) United States Patent
Hamilton et al.

(10) Patent No.: US 9,069,897 B2
(45) Date of Patent: Jun. 30, 2015

(54) CAPTURING TELEMETRY DATA BY DYNAMIC LANGUAGE ENGINE

(75) Inventors: Jennifer A. Hamilton, Seattle, WA (US); Gaurav Seth, Redmond, WA (US); Yong Qu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 796 days.

(21) Appl. No.: 13/304,178

(22) Filed: Nov. 23, 2011

(65) Prior Publication Data

US 2013/0132930 A1 May 23, 2013

(51) Int. Cl.
G06F 9/44 (2006.01)
G06F 11/36 (2006.01)
G06F 11/07 (2006.01)

(52) U.S. Cl.
CPC .......... *G06F 11/366* (2013.01); *G06F 11/0709* (2013.01); *G06F 11/0748* (2013.01); *G06F 11/0778* (2013.01)

(58) Field of Classification Search
None
See application file for complete search history.

(56) References Cited

U.S. PATENT DOCUMENTS

| | | | |
|---|---|---|---|
| 6,493,834 B1 | 12/2002 | Bates et al. | |
| 7,516,441 B2 | 4/2009 | Hamilton et al. | |
| 7,596,780 B2 | 9/2009 | Selitrennikoff et al. | |
| 7,681,182 B1 | 3/2010 | Mistry et al. | |
| 7,716,633 B1* | 5/2010 | Heath | 717/106 |
| 7,836,428 B2 | 11/2010 | Mitchell et al. | |
| 2003/0018961 A1 | 1/2003 | Ogasawara | |
| 2005/0262472 A1* | 11/2005 | Wood et al. | 717/102 |
| 2007/0135949 A1* | 6/2007 | Snover et al. | 700/86 |
| 2007/0294392 A1* | 12/2007 | Balasubramanian et al. | 709/224 |
| 2008/0022267 A1 | 1/2008 | Johnson, Jr. et al. | |
| 2008/0082964 A1* | 4/2008 | Bockenhauer et al. | 717/115 |
| 2009/0287731 A1* | 11/2009 | Motoyama et al. | 707/102 |
| 2010/0153927 A1 | 6/2010 | Stall et al. | |
| 2011/0271148 A1* | 11/2011 | Eigler et al. | 714/45 |

FOREIGN PATENT DOCUMENTS

CN 101794224 A 8/2010

OTHER PUBLICATIONS

Angelino et al., StarFlow: A Script-Centri Data Analysis Environment, Springer-Verlag Berlin Heidelberg, pp. 236-250.*
"Google-Web-Toolkit", Retrieved on: Oct. 7, 2011, Available at: http://code.google.com/p/google-web-toolkit/wiki/WebModeExceptions.
"Exception Handling in the Mono Runtime", Retrieved on: Oct. 7, 2011, Available at: http://www.mono-project.com/Mono:Runtime:Documentation:ExceptionHandling.
Kochhar, Vishal, "How a C++ Compiler Implements Exception Handling", Published on: Apr. 15, 2002, Available at: http://www.codeproject.com/KB/cpp/exceptionhandler.aspx.
"Error Handling", Retrieved on: Oct. 7, 2011, Available at: http://msdn.microsoft.com/en-us/library/cc189070(v=vs.95).aspx.
"First Office Action and Search Report Issued in Chinese Patent Application No. 201210480034.6", Mailed Date: Oct. 24, 2014, 13 Pages.

* cited by examiner

*Primary Examiner* — Don Wong
*Assistant Examiner* — Reshaun M Finkley
(74) *Attorney, Agent, or Firm* — Ben Tabor; Dolan Stein; Micky Minhas

(57) ABSTRACT

At least one embodiment described herein relates to the selective capturing of script code stacks associated with exceptions thrown by script code. For unhandled exceptions, the script engine 1) captures the script code stack in a host-accessible manner in which a host that hosts the script engine may access the captured script code stack, 2) completes unwinding of the script stack, and 3) reports the captured script code stack to a host that hosts the script engine. For at least one of the handled exceptions thrown by the script code for which the script code itself handles the exception, the script code stack is not captured in the host-accessible manner. Also, the call stack property of an error object is populated at throw time, rather than creation time.

20 Claims, 4 Drawing Sheets

CAPTURING TELEMETRY DATA BY DYNAMIC LANGUAGE ENGINE

BACKGROUND

When developing software, it is often helpful to capture telemetry information regarding unexpected behaviors when executing the software. An example of such telemetry information includes functional stack information. Such telemetry information may be used by the developer to remove unexpected behaviors to thereby improve the quality of the software.

The extraction of telemetry information about script applications (such as a web site or web application) is a difficult challenge as such script applications operate within a host environment such as an operating system or browser. Developers used extensions and/or indirect script language features in their user scripts to extract and process such information. This does not work well in all scenarios. Furthermore, there was no easy way to allow hosts to treat this information natively in a host-specific manner

BRIEF SUMMARY

At least one embodiment described herein relates to the selective capturing of script code stacks associated with exceptions thrown by script code. For at least one unhandled exception thrown by the script code for which the script code does not handle the exception, the script engine 1) captures a script code stack in a host-accessible manner in which a host that hosts the script engine may access the captured script code stack, 2) completes unwinding of the script stack, and 3) reports the captured script code stack to a host that hosts the script engine. For at least one handled exception thrown by the script code for which the script code itself handles the exception, the script code stack is not captured in the host-accessible manner. Thus, at least in that latter case, the overhead associated with capturing the script code stack so that it is accessed by the host may be saved.

At least one embodiment described herein relates to the execution of user script in which an error object is created that may have an associated unpopulated call stack property. Upon the script code throwing an exception associated with the error object, the script code stack at throw time is captured and used to populate the call stack property of the error object. Since the call stack property is populated at throw time, rather than creation time of the error object, the call stack property is much more relevant to help evaluate the dynamic bindings that existed at the time of the throw.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, at least one embodiment described herein relates to the selective capturing of script code stacks associated with exceptions thrown by script code. For unhandled exceptions, the script engine 1) captures the script code stack in a host-accessible manner in which a host that hosts the script engine may access the captured script code stack, 2) completes unwinding of the script stack, and 3) reports the captured script code stack to a host that hosts the script engine. For at least one of the handled exceptions thrown by the script code for which the script code itself handles the exception, the script code stack is not captured in the host-accessible manner. Also, in some embodiments described herein, an error object is created by the user script. A call stack property of the error object is populated at throw time, rather than creation time. First, some introductory discussion regarding computing systems will be described with respect to FIG. 1. Then, the embodiments of the capturing of script code stack will be described with respect to FIGS. 2 through 5.

Figure 1:
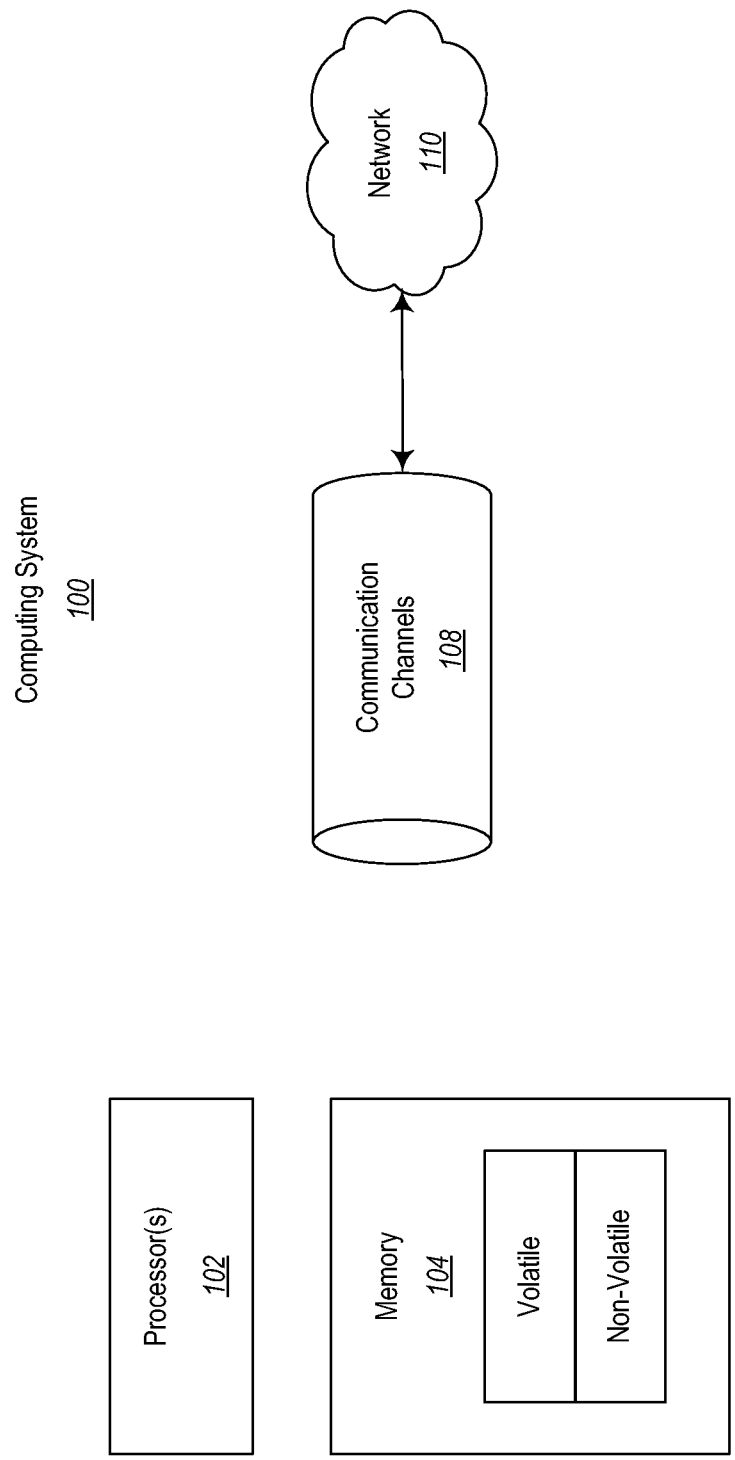
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
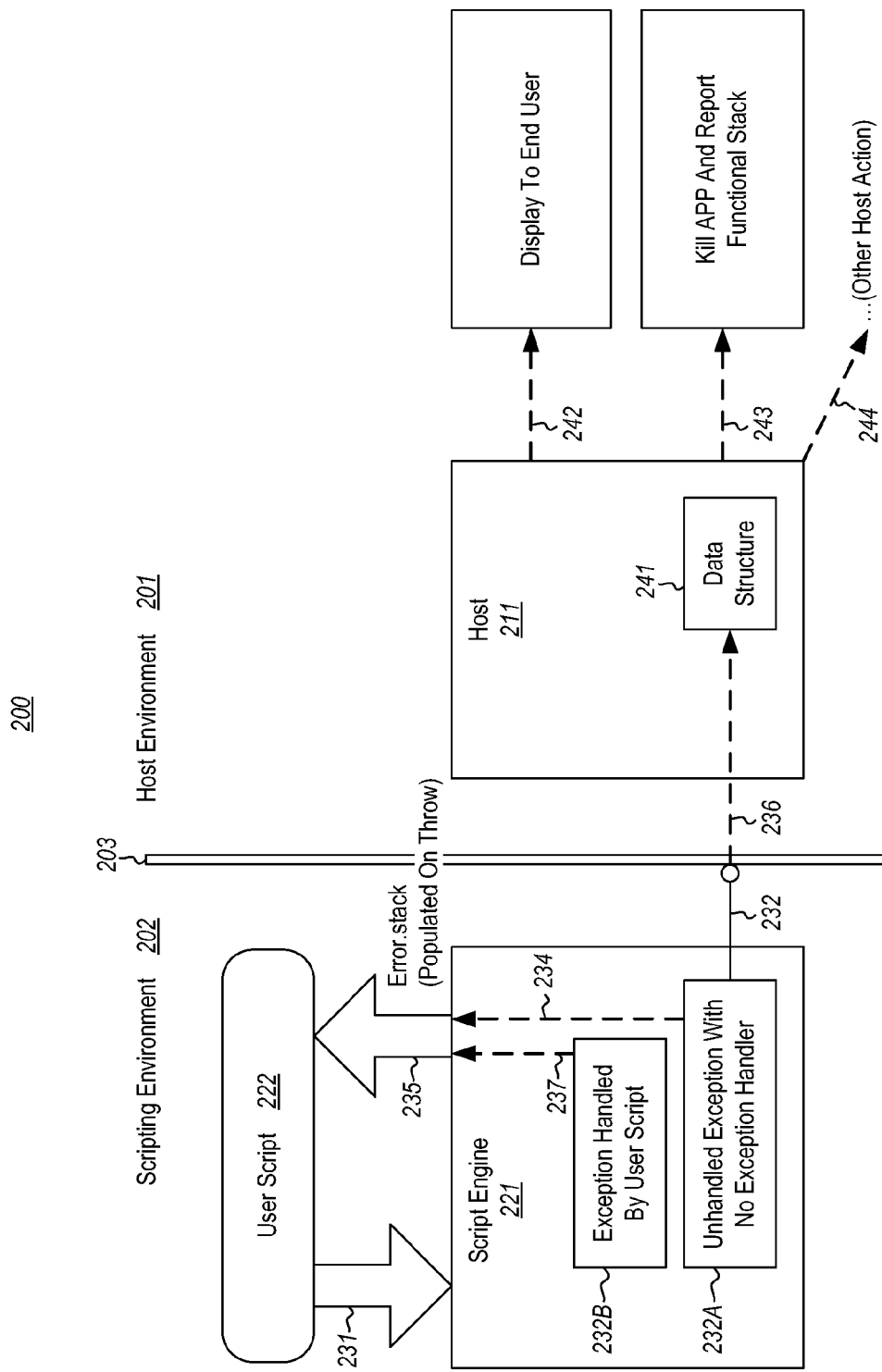
FIG. 2 illustrates an environment that may be implemented by the computing system of FIG. 1, and that includes a host environment and a scripting environment.

FIG. 2 illustrates an environment 200 in which the principles described herein may operate. The environment 200 may be implemented by a computing system such as the computing system 100 of FIG. 1. The environment 200 includes a hosting environment 201 and a scripting environment 202.

The scripting environment 202 includes a script engine 221 which is capable of reading, understanding, and executing script (such as user script 222) at runtime. Most typically, the script engine 221 understands script code that is drafted in accordance with a particular script language. ECMAScript is an example of a script language, although there are many script languages currently in existence and the principles described herein are not even limited to currently existing script languages. Many script languages are dynamic languages in which there is no clearly defined type system, and bindings are often only defined at runtime. Depending on the implementation, the script engine 221 may perform compiling and/or interpretation in order to properly understand the user script 222 and provide the appropriate machine code to be executing by the processor(s) (e.g., processors 102) of the computing system (e.g., computing system 100).

The host environment 201 includes a host 211 that provides an environment in which the script engine 221 operates. The boundary between the script environment 202 and the host environment 201 is represented abstractly by barrier 203. An example of the host 211 is perhaps an operating system or a browser, although the host 211 may be any component, application, system or combination thereof that is capable of hosting the script environment 202.

Specifically, the host 211 hosts the script environment by retaining control of execution when script is not being executed. However, when the host 211 encounters script, the host 211 provides the script to the script engine 221, and passes control of execution to the script engine 221. When the script engine 221 has completed processing, the script engine 211 passes execution control back to the host 211. The host 211 also receives notifications from the script engine 221 resulting from the execution of the script. For instance, some of those notifications may be error messages, which may result in an exception being thrown within the host 211. Other types of notifications involve the output from normal operation of the script. The host 211 will have its own object model, and the output of the script execution may affect the creation or population of objects within the object model of the host 211.

Although not required, but as would almost always be the case, the host 211 may also perform other functions such as user interaction. For instance, the host may display graphical interfaces to the user, and receive input from the user, via the graphical interfaces and/or other input devices.

The host 211 may also provide a security barrier for executing script by preventing executing script from performing certain functions that have the potential to be harmful since script is often code that received externally to the computing system, and could be authored by a number of authors, of a variety of skill and intent. The host 211 might also provide security by filtering all requests made by the script to ascertain whether to honor the request or not. In some cases, perhaps continued execution of the script might be ascertained as harmful in which case the host 211 may cause the script engine 221 to cease execution of the script 222 altogether.

The operation of the host 211, the script engine 221, and the user script 222 may be performed by a computing system in response to one or more processors (e.g., processor(s) 102) of the computing system (e.g., computing system 100) executing computer-executable instructions that are present on one or more computer-readable media (such as computer-storage media) that represent a computer program product.

The remaining references in FIG. 2 will be described with respect to the flowcharts of FIGS. 3 and 4, which describe potential operations of the environment 200 of FIG. 2 in the case in which execution of the script code 222 causes an exception to be thrown. Accordingly, FIGS. 3 and 4 will now be described with frequent reference to the environment 200 of FIG. 2.

Figure 3:
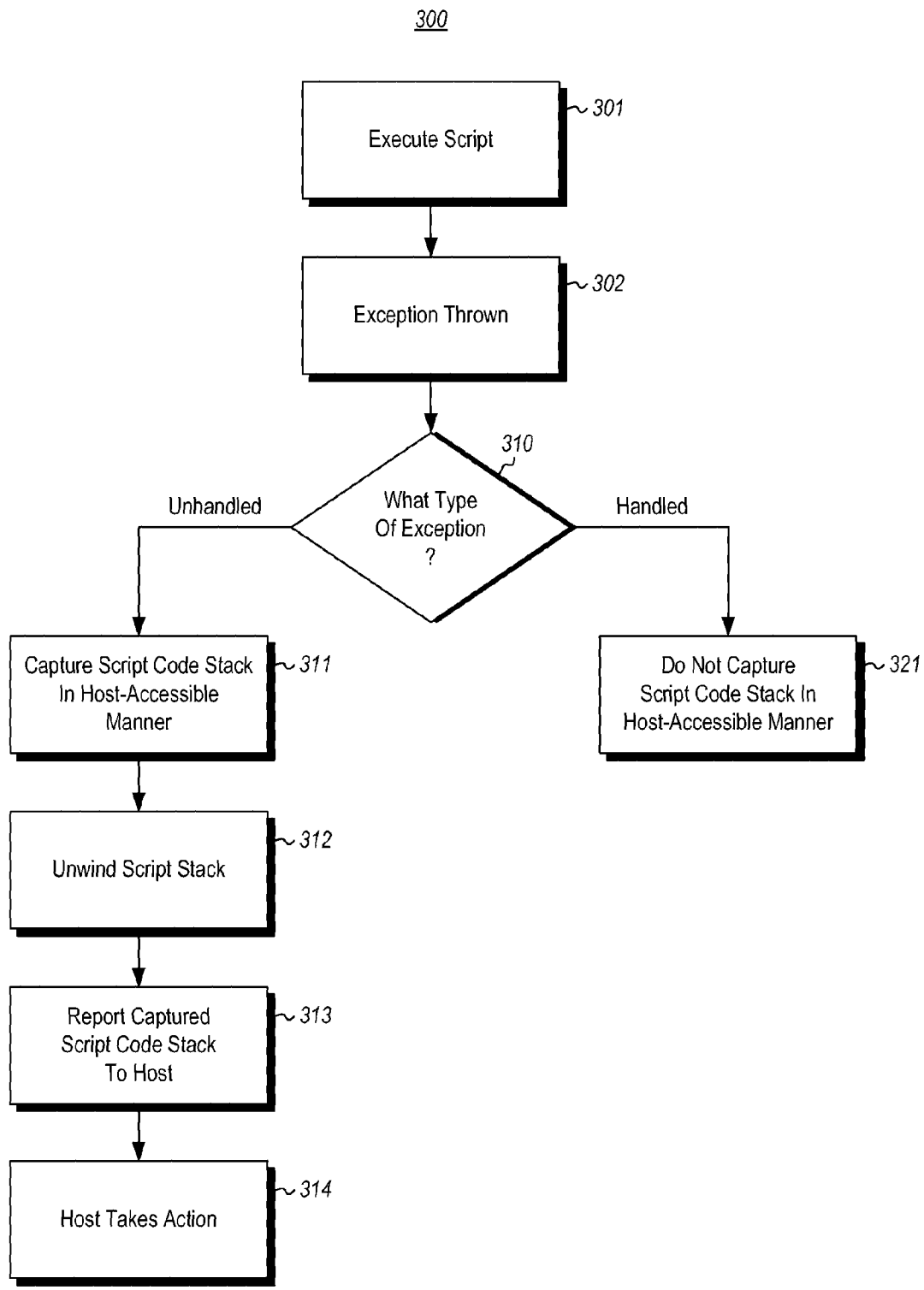
FIG. 3 illustrates a flowchart of a method for selectively capturing script code stacks associated with exceptions thrown by script code in a manner that is host-accessible.

FIG. 3 illustrates a flowchart of a method 300 for selectively capturing script code stacks associated with a plurality of exceptions thrown by script code. For instance, the method 300 may be performed by the script engine 221 of FIG. 2. The illustrated method 300 begins with the script engine executing the user script (act 301). For instance, in FIG. 2, the script engine 221 executes user script 222.

The user script then throws an exception (act 302). Exceptions are thrown when normal operation of user script is deviated from. In some cases, this may mean that the execution of the user script should terminate. There are numerous reasons why exceptions might be thrown, and it would not be practical to enumerate even a small fraction or such reasons here. However, a few examples might be that the user script tries to access a property value for which there is no value, or the user script tries to access a system resource that is not available, or the user script attempts to solve a problem for which there is an undefined solution.

The execution of user script may often throw exceptions, especially when the user script is under development. Telemetry information is information about the operation of the computing system. An intelligent telemetry system can differentiate between when the application is under development and when it is deployed for use. The principles described herein allow authors of user script to gather telemetry information regarding the operation of the computing system, so that the author may determine the cause for the exception being thrown, correct any errors in the user script that contributed to the exception, and retry the execution of the script code. By repeating this process, the user script may be refined and improved and helps improving the end user experience by improving the reliability of web sites and web applications that are deployed on end user machines. Examples of telemetry information that might be gathered include a sampling of the user script call stack (also called herein "script stack"). In some cases, exceptions may be thrown multiple times during the execution of script code in which case the method 300 may be repeated from act 302 onwards whenever an exception is encountered.

Figure 5:
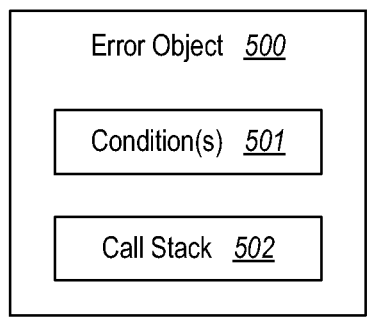
FIG. 5 abstractly illustrates an error object data structure that includes a throw condition(s) property and a stack property that is populated when the throw condition(s) are met rather than when the error object is created.

In this description, the term "exception" is to be interpreted broadly unless otherwise expressly stated to include the manifestation of any execution error by the script. In some cases, an exception might not result in the operating system, but nevertheless as long as the user script manifests that an error has occurred, an exception has been thrown within the meaning described herein. For instance, in some embodiments, an exception may be thrown by the user script when the error conditions for a previously created error object have been met. FIG. 5 abstractly illustrates an error object 500 data structure. The error object includes condition(s) 501 that represent throw conditions. If the throw conditions are ever met, the error object is thrown at that time. For instance, in ECMAScript, there is a concept of an error object, which is a standard object that may have associated error conditions describing circumstances under which the error object will be considered as thrown.

Further processing of the method 300 may depend on whether or not the exception is unhandled or handled by the user script (decision block 310). An "unhandled exception" is an exception thrown by the user script, but which is not handled by the user script. For instance, in FIG. 2, the user script 222 throws an exception as represented by arrow 231. Mode 232A represents a mode of operation in which the exception is not handled by the user script 222.

A "handled exception" is an exception thrown by the user script, but which is handled by the user script. For instance, in FIG. 2, the user script 222 throws an exception as represented by arrow 231. Mode 232B represents a mode of operation in which the exception is handled by the user script 222.

In the case of an unhandled exception ("Unhandled" in decision block 310), the script engine captures a script code stack (act 311). A "script code stack" represents at least a portion of a script stack associated with the script code when the exception was thrown. The script code stack may be all of the script stack, or may represent only a portion of the script stack. Examples in which only a portion of the script stack is captured will be described further below.

In act 311, however, the capture of the script code stack occurs in a manner in which the host that hosts the script engine may access the captured script code stack. For instance, referring to FIG. 2, the execution mode 232A causes the script engine to capture the script code stack representing all or a portion of the script stack that existed at the time the user script 222 threw the exception as represented by arrow 231. The script engine 221 making the captured user script available to the host 211 is represented by interface 232. The host might later take further action (as represented by arrow 236) to fully access that captured script code stack. However, that further action might not occur until after the script stack is unwound and no longer directly available for analysis (as will be apparent from the later description of acts 312 and 313).

As an additional option, suppose that prior to the exception being thrown by the user script 222, the user script generated an error object (such as error object 500 of FIG. 5) with an associated throw condition(s) (such as throw conditions 501 of FIG. 5), and that the meeting of the throw condition caused the user script 222 to throw the exception. The script engine 221 might also, as part of execution mode 232A cause the user script 222 to be notified of the exception also, even though the user script 222 might not be able to handle the exception. In one example, this might be done by populating a property of the error object (e.g., stack property 502 of the error object 500 of FIG. 5) with the script code stack that existed at the time the conditions of the error object were met (at the time the exception was thrown) rather than at the time the error object was created. Referring to FIG. 2, the reporting of the exception to the user script through the error object is represented by arrows 234 and 235.

After the script code stack is captured in a manner that it is host-accessible (act 311), but before the captured script code stack is communicated to the host (act 313), the script engine completes unwinding of the script stack (act 312).

The script engine then reports the captured script code stack to the host (act 313). For instance, referring to FIG. 2, the host 211 accesses the captured script code stack as represented by arrow 236. The capture of the script code stack occurs first (act 311) because the script stack is unwound after the exception is thrown, and thus would not still be available if the script code stack was captured later.

If the exception was a handled exception ("Handled in decision block 310), then this means that the exception can be handled by the user script 222. In this case, the script code stack is not captured in the host-accessible manner (act 321). Referring to FIG. 2, when the unhandled exception was generated, the execution mode 232A causes the script code stack to be captured in a host-accessible manner (as represented by arrow 232), and also caused the script code stack to be captured so as to be available to the user script 222 (as represented by arrow 234). Thus, execution mode 232A captures the script code stack in a manner that it could expose the stack to both the host that is hosting the script engine and the user script.

However, in the handled exception case ("Handled" in decision block 310), the execution mode 232B does not capture the script code stack in a manner that is host-accessible. Rather, the execution mode 232B captures the script code stack so as make the script code stack available to the user script as represented by arrows 237 and 235. Accordingly, in the case of handled exceptions, the script engine 221 is spared from having to capture the script code stack in a host-accessible manner. Given the dynamic nature of language, user script(s) may generate a number of exceptions, especially while running the script, this may provide significant savings in the computing resources utilized by the script engine 221.

Referring back to FIG. 2, the captured script code stack is represented within the host 211 using a data structure 241 that complies with the object model of the host 211. In one embodiment, this data structure 241 may represent the total call stack including calls made within the host as well as calls made by the script stack. The host may perform a number of actions (act 314) with respect to this captured script code stack data structure 241. For instance, the host 211 may display the captured script code stack to a user (as represented by arrow 242). The host 211 may cause the script engine to cease execution of the script code and perhaps report the functional stack (as represented by arrow 243). However, the host 211 may use the captured script code stack in any other manner (as represented by arrow 244).

Figure 4:
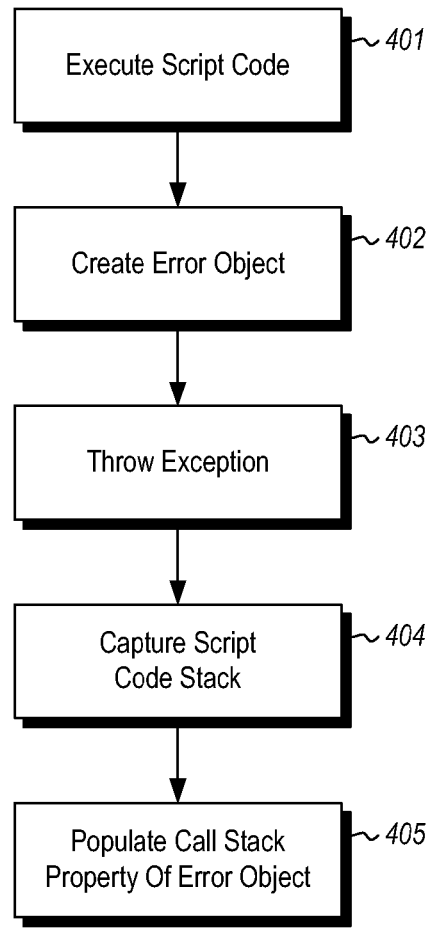
FIG. 4 illustrates a flowchart of a method for capturing script code stacks at exception throw time.

FIG. 4 illustrates a flowchart of a method 400 that was already implicitly described with respect to the method 300 of FIG. 3, but will now be expressly described. The method 400 addresses one example of how handled exceptions may be processed in the context of the user script creating an error object (such as the error object 500 of FIG. 5).

The method 400 includes the script engine executing user script (act 401). For instance, in FIG. 2, the script engine 221 executes user script 222. The user script creates an error object (such as the error object 500 of FIG. 5). The error object has throw condition(s) (which may be properties of the error object or may be otherwise specified or implied) that represent condition(s) under which the error object will be considered thrown. At the time the error object is thrown, the error object includes a populated script stack field (e.g., stack field 502 of FIG. 5), that might already be created or is created at the time when the exception is thrown.

Although not all error objects result in an exception being thrown, suppose that the throw condition(s) of the error object in our case are at some point met. This results in the user script throwing an exception associated with the error object (act 403). At this point, the script engine captures the script code stack (act 404) representing at least a portion of a script stack associated with the script code. Note that this script code stack was captured as it existed when the exception was thrown, not when the underlying error object was created. Thus, the captured script code stack is much more relevant to evaluate the cause of the exception. A call stack property is then populated with the captured script code stack (act 405). This is represented in FIG. 2 by arrows 235.

In this description, the script stack may be a logical script stack that does not reflect optimizations made by the compiler and/or interpreter, and/or may be a physical script stack that does reflect all optimizations made by the compiler and/or interpreter. For instance, suppose that as originally crafted, the user script main function X calls function Y, which calls function Z. The physical call stack would thus be as follows: X->Y->Z Now suppose that the compiler or interpreter notices that X could be altered such that it can call Z directly, without using function Y. In that case, the logical call stack would thus be as follows:
X->Z The script code stack may thus include all or portions of the physical call stack, or all or portions of the logical call stack. Alternatively, both the logical call stack (or portions thereof) and the physical call stack (or portions thereof) may be captured.

Furthermore, as previously mentioned, the captured script code stack may include all of the script stack as it existed at the time the exception was thrown. However, the captured script code stack might also include only a portion of the script code stack as it existed at the time the exception was thrown. Examples of helpful implementations in which only a portion of the script stack is captured will now be described, although embodiments in which only portions of the script stack are captured are not limited to the below.

In one example, the size of the script code stack may be configurable by a user to, for example, focus on a portion of the script code stack of particular relevance to the user. For example, the user might specify that he/she wants only the bottom five levels of the stack, or only the top five levels of the stack, or the bottom level of the stack in combination with the third through sixth levels of the stack, and so forth. This configuration may be made each time the user script is executed if desired.

Alternatively or in addition, the top portion that includes a recursive portion of the stack may be removed. For example, suppose that function A (the main function) calls function B. Now suppose function B calls function C. The call stack in that case might appear as follows:

A->B->C

Suppose that from here, execution of the user script enters a recursive mode in which function C calls function B recursively, which then again calls function C. In that case, the call stack would be expanded as follows:

A->B->C->B->C

Now suppose the recursion happens thirteen times altogether (e.g., due to a bug in the user script) before the exception is throw (perhaps due to the unexpected depth of recursion). The call stack would then appear as follows:

A->B->C->B->C->B->C->B->C->B->C->B->C->B->
C->B->C->B->C->B->C->B->C->B->C->B->C

As the call stack becomes larger, it is more difficult for a human to interpret. Accordingly, the script engine may be configured to remove the recursive portion to truncate the call stack as follows:

A->B->C

Alternatively, the script engine may capture the first recursive call (to obtain A->B->C->B) or up to (but not including) the second recursive call (to obtain A->B->C->B->C) so that the user is given an indication of the general nature of the recursion without having to manually navigate through all of the recursive cycles that occurred before the exception was thrown. In one further modification, the point of recursion might be visually emphasized in a certain way to show that some modification has occurred.

Accordingly, the principles described herein provide an effective mechanism for a script engine to appropriately channel exceptions and capture user script code in a manner that preserves computing resources, and that captures the call stack information of higher relevance to the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, for communicating script call stacks associated with unhandled script exceptions across a security barrier between a scripting environment and a host environment at the computer system, the method comprising:
presenting, at the one or more processors, a security barrier between a scripting environment that includes a script engine and a host environment that includes a host component, the host component maintaining execution control at the one or more processors when scripts are not being executed at the script engine, the security barrier being configured to separate the script engine from the host component, the security barrier including an interface for communicating script call stacks between the script engine and the host component;
during execution of script code at the script engine, detecting, by the script engine, that a first exception has been thrown by the script code, the first exception being an unhandled exception because the script code lacks code for handling the first exception, and performing at least the following based the first exception having been thrown by the script code:
the script engine capturing a first script call stack representing at least a portion of a script stack associated with execution of the script code at the script engine when the first exception was thrown, wherein capturing the first script call stack includes capturing the first script call stack in a host-accessible manner in which the first script call stack can be communicated to the host component using an object model of the host component;
the script engine completing unwinding of the script stack after capturing the first script call stack; and
the script engine communicating the first script call stack to the host component over the interface in the security barrier using the object model of the host component; and
during execution of the script code at the script engine, detecting, by the script engine, that a second exception has been thrown by the script code, the second exception being a handled exception because the script code includes code for handling the second exception, and performing at least the following based the second exception having been thrown by the script code:
the script engine capturing a second script call stack representing at least a portion of the script stack associated with execution of the script code at the script engine when the second exception was thrown, wherein capturing the second script call stack includes capturing the script call stack in a script-accessible manner;
the script engine abstaining from capturing any script call stack in the host-accessible manner; and
the script engine communicating the second script call stack to the script code.

2. The method in accordance with claim 1, wherein the host component is an operating system.

3. The method in accordance with claim 1, wherein the host component is a browser.

4. The method in accordance with claim 1, wherein the first script call stack represents a subset of the script stack at the time the first exception was thrown.

5. The computer program product in accordance with claim 1, wherein the first script call stack represents all of the script stack at the time the first exception was thrown.

6. The method in accordance with claim 1, wherein the first script call stack represents a portion of the script stack at the time the first exception was thrown, in which a top portion of the script stack is removed.

7. The method in accordance with claim 6, wherein a bottom portion of the script stack that remains in the first script call stack includes a number of stack frames that is configurable by a user.

8. The method in accordance with claim 6, wherein the top portion includes a recursion portion.

9. The method in accordance with claim 1, wherein the script engine completing unwinding of the script stack after capturing the first script call stack occurs before the script engine communicating the first script code stack to the host component.

10. The method in accordance with claim 1, wherein the host component performs the following for the first exception:
displaying the first script call stack to a user.

11. The method in accordance with claim 1, wherein the host component performs the following for the first exception:
causing the script engine to cease execution of the script code.

12. The method in accordance with claim 1, wherein the first script call stack is a logical script call stack.

13. The method in accordance with claim 1, wherein the first script call stack is a physical script call stack.

14. A computer program product comprising one or more hardware storage devices having stored thereon computer-executable instructions that, when executed by one or more processors of a computer system, cause the computer system to communicate script call stacks associated with unhandled script exceptions across a security barrier between a scripting environment and a host environment at the computer system, including at least the following:
  presenting, at the one or more processors, a security barrier between a scripting environment that includes a script engine and a host environment that includes a host component, the host component maintaining execution control at the one or more processors when scripts are not being executed at the script engine, the security barrier being configured to separate the script engine from the host component, the security barrier including an interface for communicating script call stacks between the script engine and the host component;
  during execution of script code at the script engine, detecting, by the script engine, that a first exception has been thrown by the script code, the first exception being an unhandled exception because the script code lacks code for handling the first exception, and performing at least the following based the first exception having been thrown by the script code:
    the script engine capturing a first script call stack representing at least a portion of a script stack associated with execution of the script code at the script engine when the first exception was thrown, wherein capturing the first script call stack includes capturing the first script call stack in a host-accessible manner in which the first script call stack can be communicated to the host component using an object model of the host component;
    the script engine completing unwinding of the script stack after capturing the first script call stack; and
    the script engine communicating the first script call stack to the host component over the interface in the security barrier using the object model of the host component; and
  during execution of the script code at the script engine, detecting, by the script engine, that a second exception has been thrown by the script code, the second exception being a handled exception because the script code includes code for handling the second exception, and performing at least the following based the second exception having been thrown by the script code:
    the script engine capturing a second script call stack representing at least a portion of the script stack associated with execution of the script code at the script engine when the second exception was thrown, wherein capturing the second script call stack includes capturing the script call stack in a script-accessible manner;
    the script engine abstaining from capturing any script call stack in the host-accessible manner; and
    the script engine communicating the second script call stack to the script code.

15. The computer program product in accordance with claim 14, wherein the script engine completing unwinding of the script stack after capturing the first script call stack occurs before the script engine communicating the first script code stack to the host component.

16. The computer program product in accordance with claim 14, wherein the host component performs the following for the first exception:
  displaying the first script call stack to a user.

17. A computer system, comprising:
  one or more processors; and
  one or more hardware storage devices having stored thereon computer-executable instructions that, when executed by the one or more processors, cause the computer system to communicate script call stacks associated with unhandled script exceptions across a security barrier between a scripting environment and a host environment at the computer system, including at least the following:
    presenting, at the one or more processors, a security barrier between a scripting environment that includes a script engine and a host environment that includes a host component, the host component maintaining execution control at the one or more processors when scripts are not being executed at the script engine, the security barrier being configured to separate the script engine from the host component, the security barrier including an interface for communicating script call stacks between the script engine and the host component;
    during execution of script code at the script engine, detecting, by the script engine, that a first exception has been thrown by the script code, the first exception being an unhandled exception because the script code lacks code for handling the first exception, and performing at least the following based the first exception having been thrown by the script code:
      the script engine capturing a first script call stack representing at least a portion of a script stack associated with execution of the script code at the script engine when the first exception was thrown, wherein capturing the first script call stack includes capturing the first script call stack in a host-accessible manner in which the first script call stack can be communicated to the host component using an object model of the host component;
      the script engine completing unwinding of the script stack after capturing the first script call stack; and
      the script engine communicating the first script call stack to the host component over the interface in the security barrier using the object model of the host component; and
    during execution of the script code at the script engine, detecting, by the script engine, that a second exception has been thrown by the script code, the second exception being a handled exception because the script code includes code for handling the second exception, and performing at least the following based the second exception having been thrown by the script code:
      the script engine capturing a second script call stack representing at least a portion of the script stack associated with execution of the script code at the script engine when the second exception was thrown, wherein capturing the second script call stack includes capturing the script call stack in a script-accessible manner;
      the script engine abstaining from capturing any script call stack in the host-accessible manner; and
      the script engine communicating the second script call stack to the script code.

18. The computer system in accordance with claim 17, wherein the script engine completing unwinding of the script stack after capturing the first script call stack occurs before the script engine communicating the first script code stack to the host component.

19. The computer system in accordance with claim 17, wherein the host component performs the following for the first exception:
   displaying the first script call stack to a user.

20. The computer system in accordance with claim 17, wherein the host component performs the following for the first exception:
   causing the script engine to cease execution of the script code.

* * * * *